United States Patent
Newell

(10) Patent No.: US 10,353,638 B2
(45) Date of Patent: Jul. 16, 2019

(54) SECURITY METHOD AND APPARATUS TO PREVENT REPLAY OF EXTERNAL MEMORY DATA TO INTEGRATED CIRCUITS HAVING ONLY ONE-TIME PROGRAMMABLE NON-VOLATILE MEMORY

(71) Applicant: Microsemi SoC Corporation, San Jose, CA (US)

(72) Inventor: G. Richard Newell, Tracy, CA (US)

(73) Assignee: MICROSEMI SOC CORPORATION, San Jose, CA (US)

( * ) Notice: Subject to any disclaimer, the term of this patent is extended or adjusted under 35 U.S.C. 154(b) by 50 days.

(21) Appl. No.: 14/941,991

(22) Filed: Nov. 16, 2015

(65) Prior Publication Data

US 2016/0140357 A1    May 19, 2016

Related U.S. Application Data

(60) Provisional application No. 62/081,452, filed on Nov. 18, 2014.

(51) Int. Cl.
*G06F 3/06* (2006.01)
*G06F 21/79* (2013.01)

(52) U.S. Cl.
CPC .......... *G06F 3/0679* (2013.01); *G06F 21/79* (2013.01)

(58) Field of Classification Search
CPC ........ G06F 3/0679; G06F 21/79; G06F 21/64; G06F 21/34; H04L 63/0838
USPC ...................................................... 726/200
See application file for complete search history.

(56) References Cited

U.S. PATENT DOCUMENTS

| | | |
|---|---|---|
| 6,446,242 B1 | 9/2002 | Lien et al. |
| 6,904,527 B1 | 6/2005 | Parlour et al. |
| 7,406,716 B2 | 7/2008 | Kanamori et al. |
| 7,716,497 B1 | 5/2010 | Trimberger et al. |
| 7,719,497 B2 | 5/2010 | Jeon et al. |
| 7,778,502 B2 | 8/2010 | Hiruta et al. |
| 7,788,502 B1 | 8/2010 | Donlin et al. |
| 8,427,193 B1 | 4/2013 | Trimberger et al. |

(Continued)

FOREIGN PATENT DOCUMENTS

| | | | | |
|---|---|---|---|---|
| GB | 2499985 A | * | 9/2013 | ............ G06F 21/64 |
| WO | 2004006071 | | 1/2004 | |
| WO | WO 2004006071 A1 | * | 1/2004 | ........... G06F 21/575 |

OTHER PUBLICATIONS

David McGrew, "Efficient authentication of large, dynamic data sets using Galois/Counter Mode (GCM)," Proceedings of the Third IEEE International Security in Storage Workshop, 2005, 6 pages.

(Continued)

*Primary Examiner* — Mohammed Waliullah
(74) *Attorney, Agent, or Firm* — Glass and Associates; Kenneth Glass; Kenneth D'Alessandro

(57) ABSTRACT

A method for generating a secure nonce using a one-time programmable (OTP) memory within an integrated circuit to provide persistence, the method including randomly selecting k currently-unprogrammed bits in the OTP memory, creating a data set using data derived from current contents of the OTP memory altered by changing the states of the k currently-unprogrammed bits of the OTP memory, and employing as the secure nonce the data set or data derived from the data set. The selected k bits are programmed in the OTP memory.

12 Claims, 5 Drawing Sheets

| k | $H_{num}$ | k | $H_{num}$ | k | $H_{num}$ | k | $H_{num}$ | k | $H_{num}$ |
|---|---|---|---|---|---|---|---|---|---|
| 1 | -0.0 | 7 | -12.3 | 13 | -32.5 | 19 | -56.8 | 25 | -83.6 |
| 2 | -1.0 | 8 | -15.3 | 14 | -36.3 | 20 | -61.1 | 26 | -88.3 |
| 3 | -2.6 | 9 | -18.5 | 15 | -40.3 | 21 | -65.5 | 27 | -93.1 |
| 4 | -4.6 | 10 | -21.8 | 16 | -44.3 | 22 | -69.9 | 28 | -97.9 |
| 5 | -6.9 | 11 | -25.3 | 17 | -48.3 | 23 | -74.5 | 29 | -102.8 |
| 6 | -9.5 | 12 | -28.8 | 18 | -52.5 | 24 | -79.0 | 30 | -107.7 |

Cumulative Entropy From Numerators = $H_{num} = f(k) = \sum_{i=1\ldots k} -\log_2(i) = -\log_2(k!)$

(56) References Cited

U.S. PATENT DOCUMENTS

| | | | |
|---|---|---|---|
| 8,547,136 B1 | 10/2013 | Guilloteau et al. | |
| 8,729,922 B2 | 5/2014 | McElvain et al. | |
| 8,949,586 B2 | 2/2015 | Grieco et al. | |
| 9,009,492 B2* | 4/2015 | Belenky | G06F 21/64 713/180 |
| 2002/0150252 A1 | 10/2002 | Wong et al. | |
| 2002/0199110 A1 | 12/2002 | Kean et al. | |
| 2003/0159047 A1* | 8/2003 | Smeets | G06F 12/1408 713/176 |
| 2003/0172268 A1 | 9/2003 | Walmsley et al. | |
| 2004/0177050 A1* | 9/2004 | Athens | G06F 21/606 705/408 |
| 2004/0190868 A1* | 9/2004 | Nakano | G06F 21/10 386/234 |
| 2004/0255152 A1 | 12/2004 | Kanamori et al. | |
| 2006/0107320 A1 | 5/2006 | Bhatt et al. | |
| 2007/0107056 A1 | 5/2007 | Frank et al. | |
| 2007/0233982 A1* | 10/2007 | Chen | G06F 12/1408 711/163 |
| 2008/0022108 A1 | 1/2008 | Brannock et al. | |
| 2008/0148001 A1* | 6/2008 | Gehrmann | G06F 21/57 711/164 |
| 2008/0312858 A1 | 12/2008 | Baseman et al. | |
| 2009/0132624 A1* | 5/2009 | Haselsteiner | G06F 7/588 708/255 |
| 2009/0144559 A1 | 6/2009 | Lee et al. | |
| 2010/0031026 A1 | 2/2010 | Cizas et al. | |
| 2010/0082987 A1 | 4/2010 | Thom et al. | |
| 2010/0174920 A1* | 7/2010 | Buckingham | G06F 12/1416 713/193 |
| 2010/0198896 A1* | 8/2010 | Hoefler | G06F 7/588 708/250 |
| 2011/0029779 A1 | 2/2011 | Sekiya et al. | |
| 2011/0088100 A1 | 4/2011 | Rutman et al. | |
| 2011/0099361 A1 | 4/2011 | Shah et al. | |
| 2011/0296440 A1 | 12/2011 | Laurich et al. | |
| 2012/0210115 A1 | 8/2012 | Park et al. | |
| 2012/0210124 A1 | 8/2012 | Lieber et al. | |
| 2012/0221864 A1 | 8/2012 | Ciet et al. | |
| 2012/0311314 A1 | 12/2012 | Cumming et al. | |
| 2013/0081144 A1* | 3/2013 | Kambayashi | H04L 9/0869 726/27 |
| 2014/0040625 A1* | 2/2014 | Belenky | G06F 21/64 713/180 |
| 2014/0247944 A1 | 9/2014 | Kocher et al. | |

OTHER PUBLICATIONS

"OpenCore Evaluation of AMPP Megafunctions,2", Altera Corporation, "OpenCore Evaluation of AMPP Megafunctions," Application Note 343, Version 1.0, Feb. 2004, 6 pages.

"OpenCore Plus Evaluation of Megafunctions", Altera Corporation. "OpenCore Plus Evaluation of Megafunctions," Application Note 320, Version 1.6, Nov. 2007, 10 pages.

Huang, "The Detection of Counterfeit Integrated Circuit by the Use of Electromagnetic Fingerprint", H. Huang, "The Detection of Counterfeit Integrated Circuit by the Use of Electromagnetic Fingerprint", Sep. 1-4, University of Toulouse, 2014 International Symposium on Electromagnetic Compatibility, 1118-1122.

* cited by examiner

| k | $H_{num}$ | k | $H_{num}$ | k | $H_{num}$ | k | $H_{num}$ | k | $H_{num}$ |
|---|---|---|---|---|---|---|---|---|---|
| 1 | -0.0 | 7 | -12.3 | 13 | -32.5 | 19 | -56.8 | 25 | -83.6 |
| 2 | -1.0 | 8 | -15.3 | 14 | -36.3 | 20 | -61.1 | 26 | -88.3 |
| 3 | -2.6 | 9 | -18.5 | 15 | -40.3 | 21 | -65.5 | 27 | -93.1 |
| 4 | -4.6 | 10 | -21.8 | 16 | -44.3 | 22 | -69.9 | 28 | -97.9 |
| 5 | -6.9 | 11 | -25.3 | 17 | -48.3 | 23 | -74.5 | 29 | -102.8 |
| 6 | -9.5 | 12 | -28.8 | 18 | -52.5 | 24 | -79.0 | 30 | -107.7 |

Cumulative Entropy From Numerators = $H_{num} = f(k) = \sum_{i=1\ldots k} -\log_2(i) = -\log_2(k!)$

FIG. 1

| Log2(N) | N | Hnet = | | |
|---|---|---|---|---|
| | | 64-bit | 80-bit | 128-bit |
| 6 | 64 b | 24 | 27 | |
| 7 | 128 b | 15 | 21 | |
| 8 | 256 b | 12 | 16 | 29 |
| 9 | 512 b | 10 | 13 | 23 |
| 10 | 1024 b | 8 | 11 | 19 |
| 11 | 2048 b | 7 | 9 | 16 |
| 12 | 4096 b | 7 | 8 | 14 |
| 13 | 1 KB | 6 | 8 | 13 |
| 14 | 2 KB | 6 | 7 | 11 |
| 15 | 4 KB | 5 | 6 | 10 |
| 16 | 8 KB | 5 | 6 | 10 |
| 17 | 16 KB | 5 | 6 | 9 |
| 18 | 32 KB | 4 | 5 | 8 |
| 19 | 64 KB | 4 | 5 | 8 |
| 20 | 128 KB | 4 | 5 | 8 |

Number of Bits Required to Achieve Different Likely Security Levels

FIG. 2

SECURITY METHOD AND APPARATUS TO PREVENT REPLAY OF EXTERNAL MEMORY DATA TO INTEGRATED CIRCUITS HAVING ONLY ONE-TIME PROGRAMMABLE NON-VOLATILE MEMORY

This application claims the benefit of U.S. Provisional Patent Application No. 62/081,452, filed Nov. 18, 2014, the contents of which are incorporated in this disclosure by reference in their entirety.

BACKGROUND

Field of the Disclosure

The present invention relates to integrated circuit technology. More particularly, the present invention relates to improved security methods and apparatus to prevent replay of external memory data to integrated circuits having only one-time programmable non-volatile memory.

Description of Related Art

Integrated circuits (ICs) such as microcontrollers, field programmable gate arrays (FPGAs) and systems on a chip (SoCs) which utilize ordinary unprotected external memory such as flash or other non-volatile memory (NVM) is relatively easy to attack in a number of ways including but not limited to monitoring the interconnects between the IC and the memory chip or reading the memory device to determine its contents (monitoring attack), copying it, modifying its contents, cutting the interconnects and controlling the resulting signals (man-in-the-middle attack). To prevent these attacks from succeeding, cryptographic methods can be used to encrypt the contents of the external memory to protect its confidentiality, and to authenticate whatever is read back as having been originated from the IC, in order to detect tampering with the data. Authentication is generally accomplished with some sort of digital "tag" or "signature," which may be stored on the IC, or even on the external memory, so long as it is difficult to forge and can be securely verified. To prevent these attacks, the tag or signature must be updated along with any changes in the associated block of data. The tag(s) must persist across power-down cycles just like the protected data. At least some secret, such as a cryptographic key, must reside on the IC to make it difficult for an adversary to forge the off-chip data, or the tag or signature, if stored off-chip.

One attack that is somewhat more difficult to mitigate is a replay attack, where data which was actually valid at one point in time, and has associated with it a valid tag or signature, is captured and replayed to the IC at a later time, e.g., after such time as those memory locations have been legitimately overwritten and the previous data is no longer valid. Because the replayed tag and data may still appear valid to the IC, it may accept the invalid data. To prevent this type of attack, the IC must keep track of a trust anchor, that differentiates whether the external data is the "fresh" (i.e., current) data, or out-of-date data that an adversary may be replaying. The trust anchor (for example a cryptographic key or digest or nonce) must be updated if and when the external data is updated. This requires trusted storage, which is generally interpreted to mean internal (on-IC) storage, as it is difficult to try and prove an external memory's contents as fresh using the same external memory to store the trust anchor. If the external data is meant to persist across power-cycles, then the on-chip trust anchor must also be persistent. Over the life of the device thousands of unique tags or signatures may need to be generated as the externally stored data is updated. In the event that the storage being utilized on the IC is one-time programmable (OTP) NVM, thousands of unique and secure tags or signatures must be generated over its life, with the current tag or signature being verifiable using stored data persistent across power cycles, while minimizing the rate at which the necessarily limited amount of on-chip one-time programmable memory bits are consumed. In an exemplary embodiment, a secure nonce, persistent through power cycles, used as a secret cryptographic key, is used in generating the tag or signature. A nonce is defined as an arbitrary number used only once in a cryptographic communication.

A secure persistent nonce may be used to protect "data at rest" against replay attacks, as above, or for other purposes as well. For example, such a nonce may be used as a secret cryptographic key to encrypt or authenticate or prevent replay attacks against "data in motion" transmitted using an unsecure communications channel. In some other applications, such as an initialization vector (IV) used in a block-cipher mode of operation, the nonce may be made public. Even though it does not need the security property of confidentiality in some particular applications, it may still need other security properties such as unpredictability and unrepeatability.

SUMMARY

The present invention improves upon the security of such a system, i.e., its robustness against these attacks, and in particular against replay attacks against (infrequently) changing but persistent off-IC data, when the IC in question does not have any rewritable NVM, but rather it only has OTP NVM. One such type of chip is represented by static random access memory (SRAM) FPGAs.

One goal of such a system is to utilize the least amount of OTP memory while creating the largest number of secure nonces over the life of the device, since once the OTP memory is completely consumed the device may become inoperable, or at the very least, unsecure. Another security-related goal is that all the nonces (both the past ones that are no longer used, or any future ones yet to be used) be unpredictable. This requirement implies that every individual IC generates a different sequence of nonces. As indicated above, the very definition of nonce requires that they be unrepeated. These security-related goals are generally opposed to the first goal (OTP memory efficiency). By unpredictable, what is meant in this context is that it is assumed in the threat model being considered that the adversary is able to extract at least the current nonce and any other non-volatile secrets from an IC at (just) one moment in time, and from this "backward security" is desired, i.e., it is desired that the adversary does not learn anything useful from the current nonce about past nonces that were intended to stay secret. "Forward security" is also desired, i.e., it is desired that the adversary has no advantage in predicting future nonces by knowing the current nonce or state of the device. If nonces were backward or forward predictable, the adversary could more easily mount a replay attack against the external memory protected by the nonce by tampering with the memory holding the nonce, or the contents of the external memory; or they may be able to defeat encryption intended to protect the confidentiality of the information. Observation of one device should not help the adversary predict nonces on another device.

The present invention provides a method of generating a sequence of nonces from data that is sequentially (in time) stored in OTP NVM on an IC. The current nonce is a data set comprised of the current OTP memory data (uncompressed form), or alternatively a typically shorter value computed from the OTP memory data (compressed form), such nonce being able to persist across power-cycles due to the non-volatile nature of the memory. Since, the memory is, by the definition of the problem being addressed, only programmable one time (and cannot be erased), each additional change to the memory that is stored consumes a portion of the OTP memory permanently and irreversibly. This scheme for utilizing the OTP memory offers better combined security and efficiency when the nonce calculated as per the invention is used to protect the IC against malicious attacks against external memory than prior art methods offered.

The high security level is because the present invention maintains a high level of entropy in both the backward and forward looking directions (in time) so that an adversary who may learn the value of the nonce at one time does not have any useful information about prior or future nonces (within a small epsilon "ε" defined by the desired security level). Within the constraints of these security goals, the invention consumes a minimal amount of scarce on-chip OTP memory each time a new data set (i.e., state of the OTP memory) is generated, or equivalently, the nonce is "iterated". Compared to prior art secure methods of equivalent security, the present invention uses more computational resources, but fewer OTP memory resources.

Secure nonces can be used for a number of different cryptographic purposes. They can be used as secret keys, for example. Or, they may be used to prevent a replay attack by making each instance of a protocol different. One important task they can help with is to secure the contents of off-chip non-volatile memory.

The present invention may be used on FPGA devices that require secured off-chip rewritable NVM and only have non-rewritable (i.e., OTP) NVM on-chip.

BRIEF DESCRIPTION OF THE DRAWING(S)

These and other features, aspects and advantages of the present invention will become better understood with regard to the following description, appended claims, and accompanying drawings where:

FIG. 1 is a chart showing efficiency of 64-bit security using a 64 bit OTP memory vs. different numbers of already-programmed bits.

FIG. 2 is a table showing an estimate of the number of bits required to achieve several different likely security levels in the vicinity of different numbers of programmed (or unprogrammed) bits.

DETAILED DESCRIPTION

Figure 3:
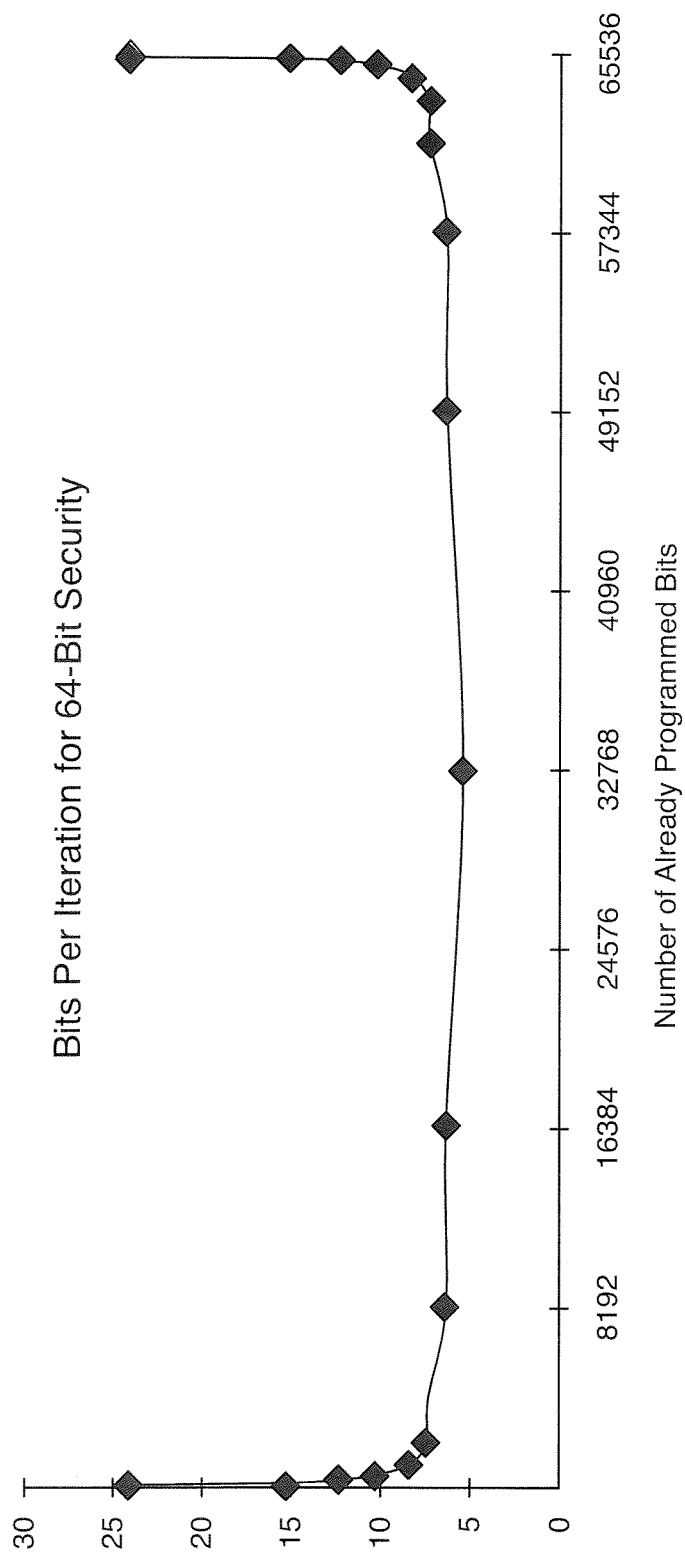
FIG. 3 is a graph illustrating the number of bits needed per iteration for 64-bit security in methods according to the present invention.

Persons of ordinary skill in the art will realize that the following description of the present invention is illustrative only and not in any way limiting. Other embodiments of the invention will readily suggest themselves to such skilled persons.

A first goal of the invention is efficiency, i.e., to utilize the least amount of OTP memory while creating the largest number of nonces over the life of the device; a second goal is security, i.e., that the nonces be unpredictable under certain security assumptions. Each time a single bit of the OTP memory is programmed the overall OTP memory is in a new state it has never been in before, since the OTP cannot be "rolled back" to any previous state due to its one-time one-way nature. Since this state is non-repeatable it can be used as a nonce, or "a number used only once" in various cryptographic protocols. If the uncompressed state of the OTP memory, which can contain thousands of bits, is optionally compressed, a potentially more easily useable short form of the nonce is made available. A trivial solution for the first goal, i.e., to generate a sequence of nonces that utilize the least amount of OTP memory, is a "thermometer counter." Unlike a binary counter which may both set and clear state bits as the count is increased, a thermometer counter always sets just one additional bit in its state memory, the next sequential bit in the memory, as the count is increased by one. Thus, unlike the binary counter, it is possible to use OTP memory if the count is only in one direction. In this case, only one additional OTP bit, such as a fuse or anti-fuse, needs to be consumed each time a new nonce is required. However, this fails the second requirement, i.e., that the nonces be unpredictable.

If an entropy level of, for example, 128 bits is desired for the "unpredictability" of the OTP state then a trivial and well known solution for the second requirement is to store a 128-bit random number each time a new nonce is required. The whole memory or just the latest word written can be used as the nonce. This gives good forward security, but no backwards security since all previous random values are still present in memory, unless every unprogrammed bit in the previous word is programmed at the same time the new random word is added to the current end of the memory, to hide the old value. However, this requires a relatively large amount of OTP memory if a significant number of nonces are required over the life of the device, roughly 128 times as much OTP memory as the simple thermometer counter.

The present invention uses a field of independently programmable OTP memory bits. At each iteration, when a secure nonce is needed, a number of currently un-programmed bits of the OTP memory are randomly selected from the entire population of un-programmed bits remaining, and the selected bits are then programmed. The number of bits programmed depends upon the security targets, i.e., the entropy required for the backward and forward security. If there are a relatively large number of already programmed bits, and also of still-unprogrammed bits to select from, then each single randomly selected and programmed bit will add more than one bit of entropy to the previous state of the memory. In the context of the present invention, the term "randomly selecting" includes any method that is meant to be sufficiently unpredictable to a potential adversary to meet the security level desired, including but not limited to any combination of using true random numbers generated from physical entropy sources or deterministic methods such as used to generate pseudo-random numbers whether sophisticated such as block ciphers or simple such as linear feedback shift registers (LFSRs).

As an example of the operation of this scheme, assume that there is a total field of 2,000 bits of OTP memory, and that, of those, so far 500 bits have been randomly selected and programmed. Also assume that the security target for the forward and backward security is for each to be greater than 80 bits of entropy. Assume that, hypothetically, the adversary somehow learned and knows the current state of the array. According to the invention, a number of bits, for example 10 bits, are randomly selected and programmed. The adversary does not know which 10 of the remaining 1,500 bits were programmed beyond the state he knows, since they were randomly selected. For a first attempt to guess of any of the 10 bits that were programmed out of the 1500 bits he knows were available, the adversary's chance of success is 10/1,500. Assuming the adversary was successful in picking one of the 10 bits on his first guess, he needs to guess one of the remaining 9 on his second guess. Since there are now only 1,499 bits to choose from, this chance is 9/1499. And so on. On his tenth and final guess he has to guess the one remaining bit correctly, out of 1491 possible remaining un-programmed bits. The chance of making 10 successful guesses in a row is $(10/1500) \cdot (9/1499) \cdot (8/1498) \cdot \ldots \cdot (2/1492) \cdot (1/1491) = (10! \cdot 1490!)/1500! = 6.48 \cdot 10^{-26} = 2^{-83.7}$.

Using more general notation, if N is the number of remaining un-programmed bits (e.g., 1500) and k is the number of bits added in an iteration or round (e.g., 10), the probability $P_f$ of the adversary guessing all k forward bits correctly is:

$$P_f = k! \cdot (N-k)!/N!$$

For the backwards security, it is assumed that the adversary knows the 510 bits at the conclusion of the last programming cycle. The adversary does not know which 10 bits were the last ones programmed and can only guess which ones they were. The adversary needs to guess correctly, and thus by a process of elimination, determine which were the 500 bits programmed at the beginning of the iteration. The adversary has a 10/510 chance of guessing any one of the last 10 bits correctly. For the second bit, the adversary's chance is 9/509. If the adversary needs to guess all 10 bits correctly the probability is $(10/510) \cdot (9/509) \cdot (8/508) \cdot \ldots \cdot (2/502) \cdot (1/501) = (10! \cdot 500!)/510! = 3.33 \cdot 10^{-21} = 2^{-68}$. With 10 randomly selected bits the entropy target of 80 bits (83.7) for forward security has been successfully met, but the 80 bit entropy target for backward security has not been met, having achieved only 68 bits of entropy. By increasing the number of randomly selected bits that are programmed up to 13, the backwards security can be increased to 84.2 bits of entropy. In more general notation, where M is the number of already programmed bits=total number of bits−N (e.g., 500), the probability $P_b$ of the adversary guessing all k (e.g., 10) backward bits is:

$$P_b = k! \cdot M!/(M+k)!$$

In the following few paragraphs several useful approximations, tables, and "rules of thumb" are presented for quickly estimating the number of bits required to be programmed to achieve any given security level. The entropy, H, measured in bits, can be approximated by the logarithm, base 2, of the probability: $H \approx -\log_2(P)$. The main advantage of the present invention is that it allows obtaining a large number of bits of entropy while only consuming a small amount of OTP memory, for example 80 bits of entropy while only consuming 13 bits of OTP memory, instead of consuming 80 bits as in the prior art. This is because instead of selecting an 80 bit full entropy random number and programming the bits that are "ones" into an 80 bit reserved word of OTP memory as in the prior art, 13 bits are selected randomly out of a much larger remaining field of bits (e.g., 500 or more) and are programmed. Note that with the method of the invention the bits which are not selected for programming on a given round are still available for programming in a future round. They are not permanently consumed, as is the case with the un-programmed bits when an 80 bit binary word is used for the nonce, thus improving the efficiency in the way bits are consumed.

Assuming the entropy targets for backward and forward security are equal, as is often the case, then the greatest marginal efficiency is obtained when the number of programmed and un-programmed bits are roughly equal. Sticking with the 2,000 bit memory example, this would be where there are approximately 1,000 bits already programmed, and 1,000 bits available to still be programmed. Then, the product terms in the backward security equation, starting from the term with the lowest numerator are 1/1001, 2/1002, 3/1003, etc. The denominators are not changing very quickly, and are all approximately $2^{10}$, i.e., the denominators are increasing the entropy by approximately 10 bits for each term that is added. The numerators are changing linearly, quickly at first, and then (on a logarithmic basis) they start to slow down. $1=2^0$, $2=2^1$, $3=2^{1.6}$, $4=2^2$, $5=2^{2.3}$, $6=2^{2.6}$, $7=2^{2.8}$, $8=2^3$, $9=2^{3.2}$, $10=2^{3.3}$, etc. In the range of the 8th term, the numerators are reducing the entropy for each added bit by around 3 bits, from the 10 contributed by the denominator, to around 7 bits per product term. As the 16th term is approached, the entropy drops another bit as the numerator is close to $2^4$. To a rough approximation, when near the halfway point in terms of consuming the OTP memory, i.e., about 1,000 bits programmed per the present example, the forward and backward security are the same. Rather than multiply the terms and then calculating the logarithm of the product to estimate the entropy, their logarithms of each product term equivalently can be added, base 2, to quickly see how many bits are required to reach any given entropy target. For example, in this range, the entropy for the 1st bit is $\log_2$(denominator)−$\log_2$(numerator) which is approx. 10−0=10, for the 2nd bit is 10−1=9, for the third bit it is 10−1.6=8.4, for the fourth 10−2=8, for the fifth 10−2.3=7.7, etc. following this sequence:

10+9+8.4+8+7.7+7.4+7.2+7+6.8+6.7+6.5+6.4+6.3+ 6.2+6.1+6+5.9 . . .

The cumulative running total of this series is approximately:

10, 19, 27.4, 35.4, 43.1, 50.5, 57.7, 64.7, 71.5, 78.2, 84.7, 91.2, 97.5, 103.7, 109.7, 115.7, 121.7 . . . .

Thus, for greater than or equal to 80-bit security (84.7, in the list above), the first 11 product terms are needed (when there are roughly 1,000 programmed and 1,000 un-programmed bits from which to choose).

When the number of programmed bits start approaching the total number of available bits, i.e., all 2,000, the denominator for backward security has climbed to about 11, and numerator progression is the same as in the last paragraph, i.e., in the marginal case near 8 bits, about 3 bits of entropy are lost. Therefore, each term adds about 8 bits of entropy (11−3), rather than 7 bits (10−3) when nearer the center.

However, near the extremes the forward and backward security are no longer roughly equal, and as we get nearer to the upper end, the forward security grows less and less with each term. At around 1,900 bits, instead of the denominator contributing 10 or 11 bits of entropy, as in the previous cases, now it is only contributing less than 7 bits, and rapidly dropping. Instead of needing 11 terms to get to 80 bit security, when near the extremes at 100 or 1,900 it takes programming roughly 22 bits to get a minimum of 80 bits of entropy to meet both the forward and backward security goals simultaneously. Note that, even in these very small but less efficient regions near the extremes of a new completely un-programmed memory and a completely programmed, used-up memory, 22 bits is still substantially more efficient than using 80 bits as in the prior art. FIG. 3 is a chart that illustrates this point by showing the cost of obtaining 64-bit forward and backward security (using a 64 Kbit OTP memory) vs. different numbers of already-programmed bits. When the number of already-programmed bits is very low it takes a larger number of bits on each iteration to reach 64-bit backward security, and when the number of already-programmed bits is very high, consequently with very few bits remaining available to program, it takes a larger number of bits on each iteration to reach 64-bit forward security. When there is both a relatively large populations of both programmed and un-programmed bits, then fewer bits are needed to achieve both the forward and backward security goals simultaneously.

For moderate to large sized memories, the less efficient regions near the ends could be discarded without too much loss of overall efficiency. For example the memory could be initialized with a few hundred random bits to move it out of the low-efficiency region, and it could be considered saturated when it gets to within a few hundred bits of being 100% programmed. At the start, if M=k is chosen and a probability target, $P_b$, is chosen to solve for M and k, another way to start-up the process is obtained, i.e., by loading M random bits to initialize the OTP for the first nonce, then using k (the same value, again) for the second nonce, after which a successively lower number of bits k should be needed until, plateauing near a minimum when half the bits are programmed (M=N), whereupon the number of required bits starts slowly climbing, again, rapidly when nearing full capacity. For a numerical example, if $P_b=2^{-64}$ (i.e., for 64-bit security) is chosen, then M=k=33; for $P_b=2^{-80}$, M=k=42; and for $P_b=2^{-128}$, M=k=66 to obtain sufficient backward security in a fresh, completely un-programmed 64 Kbit OTP memory. These values drop quickly and significantly once a few iterations are completed.

By rearranging the terms of the equation slightly, the number of bits, k, required for any security level can easily be computed from a table, a few simple calculations and a little trial and error. Except at the very extremes, the denominator changes pretty slowly, and the denominator contribution of all k product terms to the entropy can be approximated by:

$$H_{den} \approx k \cdot log_2(Q)$$

where k is the number of bits to program in each iteration of the nonce, and Q is the lesser of the programmed bits (M) plus k/2 and the un-programmed bits (N) minus k/2. If Q is varied both up and down by numbers symmetrically disposed and quite a bit smaller than itself, the geometric mean of all the numbers is very closely approximated by Q itself. For example, if the set of numbers comprising the eleven integers about 500 from 495 to 595 is formed, i.e., {500, 500+/−1, 500+/−2 . . . 500+/−5}, the geometric mean is 499.99, having a negligible error of only 20 ppm. Thus, the product of the eleven consecutive integers (495·496 . . . 594·595) may be closely approximated by $500^{11}$, and the logarithm (base 2) by $11 \cdot log_2(500)$, as in the equation for $H_{den}$, above. In other words, it is not necessary to carry out all of the detail calculations in order to make a sufficiently accurate estimate of M!/(M+k)! or (N−k)!/N! for practical purposes.

The cumulative effect of the numerator terms measured in bits of entropy is shown for different values of k in the table of FIG. 1.

The approximate entropy contributed by the numerator and denominator together in the vicinity of N programmed or M un-programmed bits remaining in the OTP memory (whichever is less) is denoted $H_{net}$, and is just the sum of: $H_{net}=H_{den}+H_{num}$, for the selected number of bits, k. The numerator in the both the forward and backward probability formulas $P_f$ and $P_b$ above is k!, thus the entropy contribution ($H_{num}$) of the numerator can be approximated by $-log_2(k!)$. Since the factorial function is the product of consecutive integers, the log of this product can be alternatively be computed as the sum of the logs of the individual product terms, i.e., as the sum of the logs of the consecutive integers. (Note, $H_{num}$ is always negative and reduces the entropy, as shown in the table of FIG. 1.)

Using the above approximation, the number of bits required to achieve several different likely security levels in the vicinity of different numbers of programmed (or un-programmed) bits can be estimated as shown in the table of FIG. 2.

Looking at it another way, a 2,000 bit memory utilized according to the present invention can generate approximately 140 80-bit secure nonces (allowing for both the broad minimum region and the higher bit usage near the extremes), whereas the same amount of memory used according to the prior art would only hold 25 80-bit words; an improvement of almost six-fold in the number of persistent nonces with 80-bit forward and backward security that can be generated using a 2000 bit OTP memory.

If the memory size is doubled to 4,000 bits, the number of 80-bit word storage locations would double to 50 using the prior art approach. But, by employing the principles of the present invention, there is an additional bonus in that each bit programmed has one more bit of entropy due to the twice-larger number of bits to randomly choose from. Fewer bits need to be programmed to achieve the same security level. So, instead of doubling from approximately 140 to 280 nonces, the larger memory can generate something over 330 80-bit secure nonces. For lower security levels and larger memories the acceleration effect is more pronounced.

At a higher security level, 128-bit security can be achieved by programming only around 10-11 bits per iteration in a slightly larger OTP memory, a savings of about twelve to one vs. consuming a 128 bit word for each iteration. For even larger OTP memories, e.g., in the 32 KB and larger range, the efficiency improvement approaches sixteen to one.

Note that in practice, the raw uncompressed entropy of the full OTP memory would usually be condensed or compressed into a more useable short binary string by computing a cryptographic digest or message authentication code (MAC) over its contents having ideally at least twice the number of bits as the desired security level. So, for 64-bit security, a digest of 128 bits could safely be used for almost any application the nonce was used for; even where collision resistance was important. Since a cryptographic digest is a one-way function with pre-image and 2nd-pre-image resistance, even if the digest is made public the internal state of the OTP is not leaked out, thus the forward and backward security are still preserved, i.e., the past and future digests are unpredictable to the design security level. A MAC can introduce a long-term secret key into the authentication tag, giving the result an additional measure of static entropy in addition to the forward- and backward-"dynamic" security provided by the contents of the nonce's OTP memory. This static key can also be stored in an OTP memory, but it is preferable that it use a different technology than the OTP memory used in the nonce so that they can't be broken with the same attack. The use of a physical unclonable function (PUF) is a good choice for creating and "storing" the long-term authentication key, or a key-encryption key used to protect it.

One way of looking at the present invention is that it is making a memory vs. computation trade-off; reducing the amount of OTP memory required for each iteration of the nonce updates, potentially by more than an order of magnitude, by using more computational effort. A larger memory results in higher efficiency in terms of a fewer number of bits consumed by each iteration, and gives a larger number of lifetime nonces in a given OTP memory, but requires more computation effort than the prior art secure nonces stored in OTP memory.

In operation, after powering up the secure integrated circuit, the IC reads the current state of its OTP memory and calculates a digest or MAC over its contents, thus reproducing the current compressed form nonce, i.e., the last nonce before power was removed. If the type of digest ("hash") or MAC is chosen carefully, and as long as the current nonce is already known, it is possible to perform an incremental update to the compressed form of the nonce in order to make update computations more efficient when, for example, only a few bits of the OTP memory (e.g., 6 or 10) are changed. Since only a few bits are changing at each iteration of the nonce, by necessity only a few words or blocks of the OTP memory are therefore being affected by the additional bits being programmed. For large OTP memories an incremental update of the compressed nonce for any changes made after the full initial power-up calculation is made may be more efficient than recalculating the digest or MAC over the full contents of the nonce's OTP memory when only small changes are made. The Galois MAC (GMAC) algorithm standardized by the National Institute of Standards and Technology (NIST) in Special Publication SP800-38D is an example of such an algorithm. The GHASH function used in the GMAC calculation is linear and thus lends itself to efficient incremental updating as described in McGrew, *Efficient authentication of large, dynamic data sets using Galois/Counter Mode (GCM)*, Proceedings of the Third IEEE International Security in Storage Workshop, 2005.

If it is acceptable for part of the entropy of the nonce to be static and a lower backward and forward security level is acceptable, then some additional efficiency can be achieved. For example, if 64-bit forward and backward security is acceptable, but in addition a 128-bit full-entropy static secret key is mixed with the state of the OTP memory as well, then the final computed nonce could have a security strength much higher than 64 bits, even though the remaining forward and backward security might still only be 64 bits in the case both the OTP contents and long-term key were compromised. This mixing could be done using encryption, or using a MAC algorithm, such as the GMAC algorithm, as described above, which could efficiently incorporate a 128-bit key and the raw (uncompressed) OTP nonce data into its output result. Since more than 128 bits of entropy is mixed efficiently in the calculation, the resulting 128-bit MAC tag should be full entropy.

In a moderately sized OTP memory (say 64 Kb=8 KB), for 64-bit forward and backward security, only about 5-6 bits would be consumed each time the nonce is iterated compared to 64 bits for a conventional secure system (or 1 bit for the unsecure thermometer-counter based nonce). Thus, a lifetime yield of over 10K nonces can be obtained from an 8 KB OTP memory, or over 2.5 nonces per day for more than 10 years before exhausting the OTP memory's full capacity. For a larger 32 KB OTP memory the cost of a 64-bit secure nonce is reduced to nearly 4 bits per iteration, so over fifty-thousand secure nonces could be generated over the life of the OTP memory. This might be roughly on the same order of magnitude as the wear-out life of the external NVM integrated circuit produced using flash memory technology, in which the re-writable data being authenticated is being stored. As shown, through judicious choices, it may be possible to roughly balance the life of the secure IC and the external NVM with respect to the number of write cycles they can reliably operate over.

Figure 4:
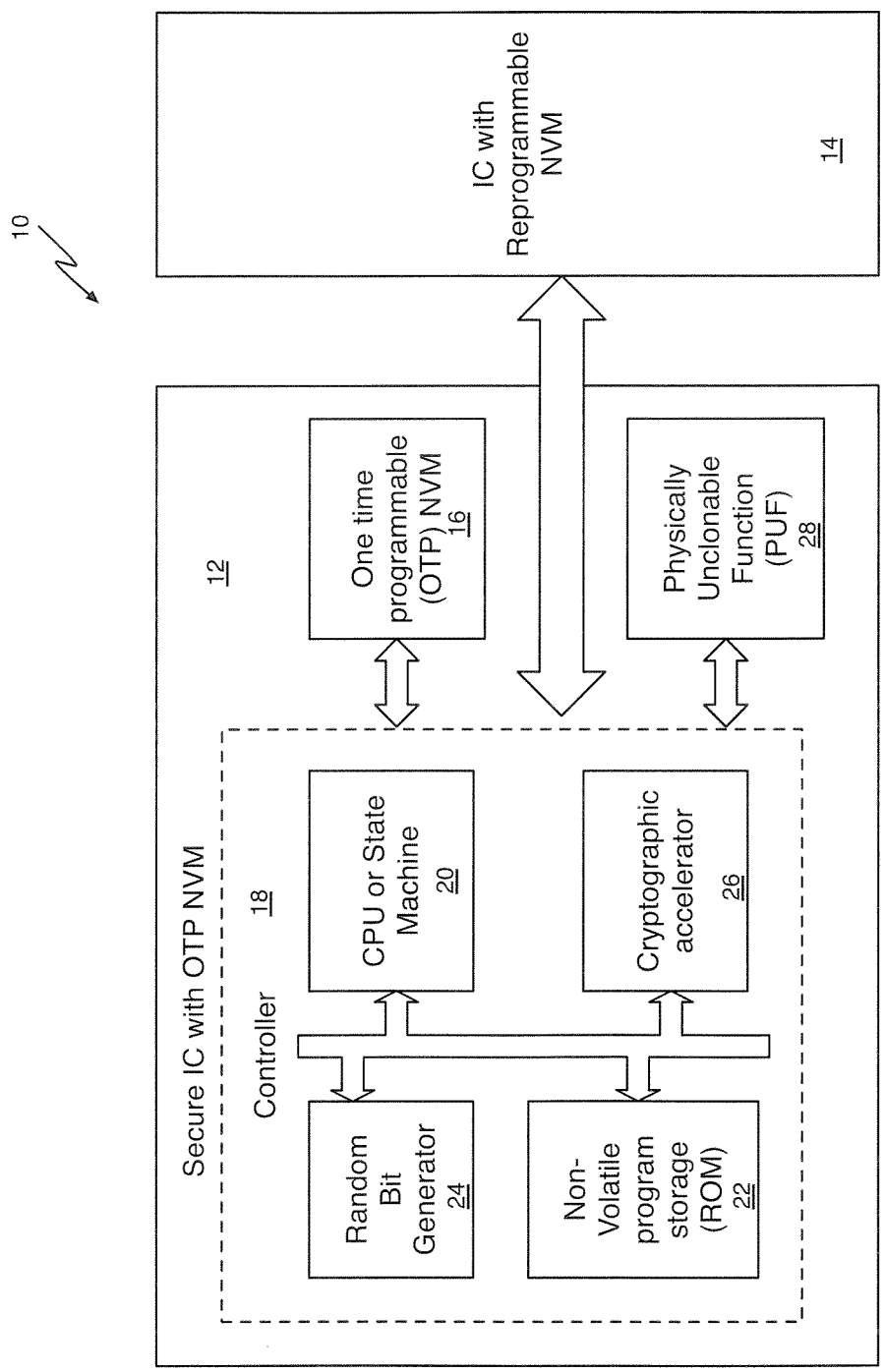
FIG. 4 is a block diagram showing a secure integrated circuit with a one-time-programmable NVM in accordance with the present invention coupled to an unsecure external reprogrammable NVM.
Figures 6, 7:
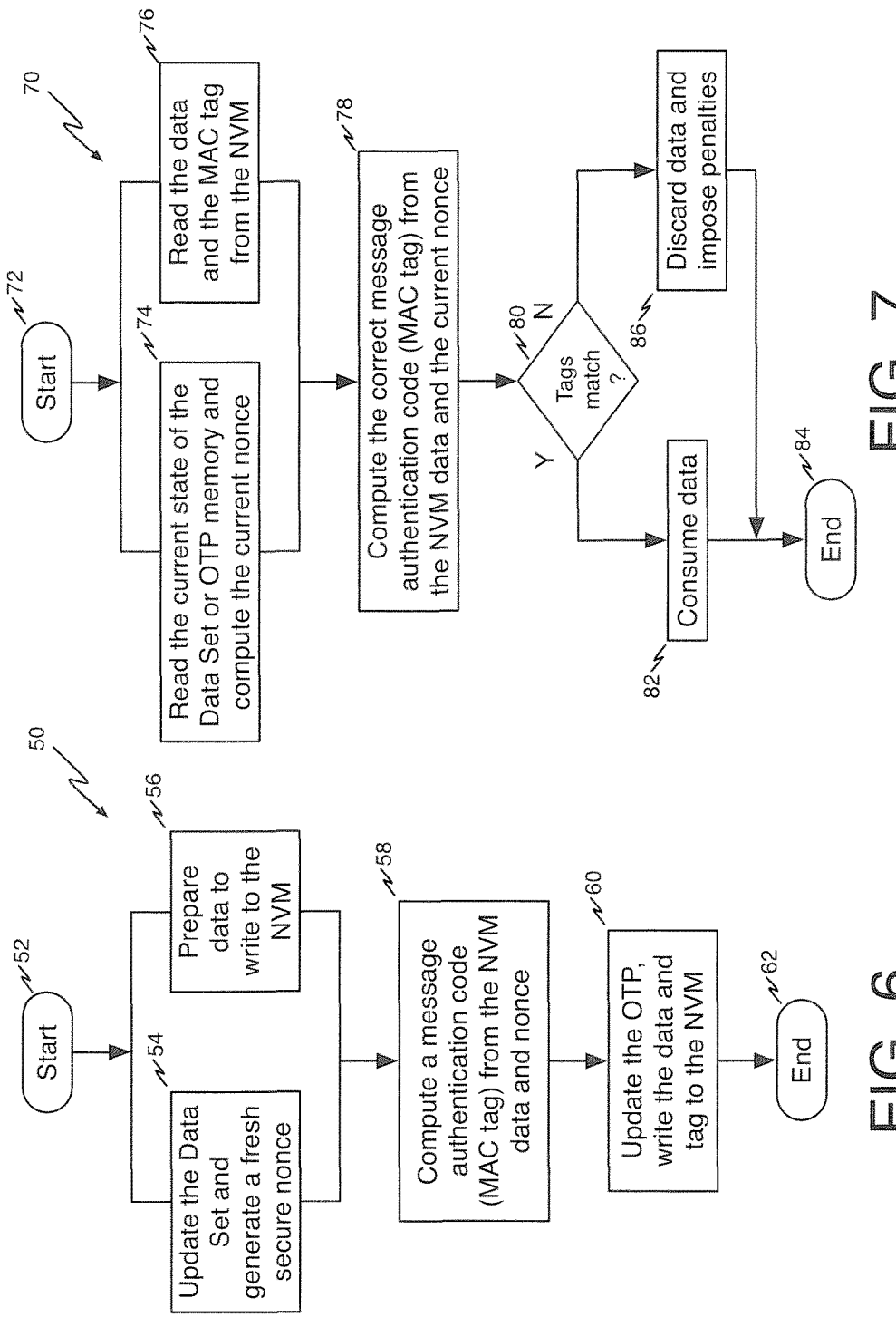
FIG. 6 is a flow chart showing an illustrative method for writing data to an external unsecure reprogrammable NVM in accordance with the present invention.
FIG. 7 is a flow chart showing an illustrative method for authenticating data received from an unsecure NVM in accordance with the present invention.

Referring now to FIG. 4, a block diagram shows a system 10 including a secure IC 12 in accordance with the present invention coupled to an unsecure external reprogrammable NVM 14. The secure IC 12 may be a user programmable IC such as an FPGA or an SoC and includes a one-time-programmable (OTP) NVM 16, which is used to hold the raw (uncompressed) form of the nonce, and which is updated per the method of the invention by having a few random bits programmed each time the nonce needs updating. Secure IC 12 includes a controller 18 having a CPU or state machine 20, non-volatile program storage memory 22, and random bit generator 24 that are used to determine which bits to update during the nonce iteration process, and for calculating the compact (compressed) form of the nonce after each power cycle and update. The reason for employing non-volatile storage elements for program storage memory 22 is so that, when the system first boots up, the first instructions that are executed by the CPU 20 are from this on-IC non-volatile storage that can be trusted. The OTP NVM 16 is coupled to the controller 18. Secure IC 12 may also include a PUF 28 which can be used to create a device-specific authentication key or a key-encryption key to protect other keys that are used in the nonce calculation. The secure nonce may be used in many types of cryptographic algorithms, for example in key generation or for preventing replay attacks in various protocols. In particular, one such use is in the authentication of the current contents of the external unsecure external reprogrammable NVM 14 when read back from the NVM 14 into the secure IC 12 for use in an unspecified end application running on the secure IC 12. The storage of data in an off-chip memory and its authentication upon retrieval using a nonce is well known in the art, and can be done in a number of different ways as best suited to the end application. One such method of writing and then reading back authenticated data is shown in FIG. 6 and FIG. 7, respectively, as will be described below.

Persons of ordinary skill in the art will appreciate that the OTP NVM 16 may be used as a configuration memory to program the secure IC 12 to define its functionality. The present invention utilizes memory cells in the OTP NVM 16 that are not used as part of the configuration memory.

Figure 5:
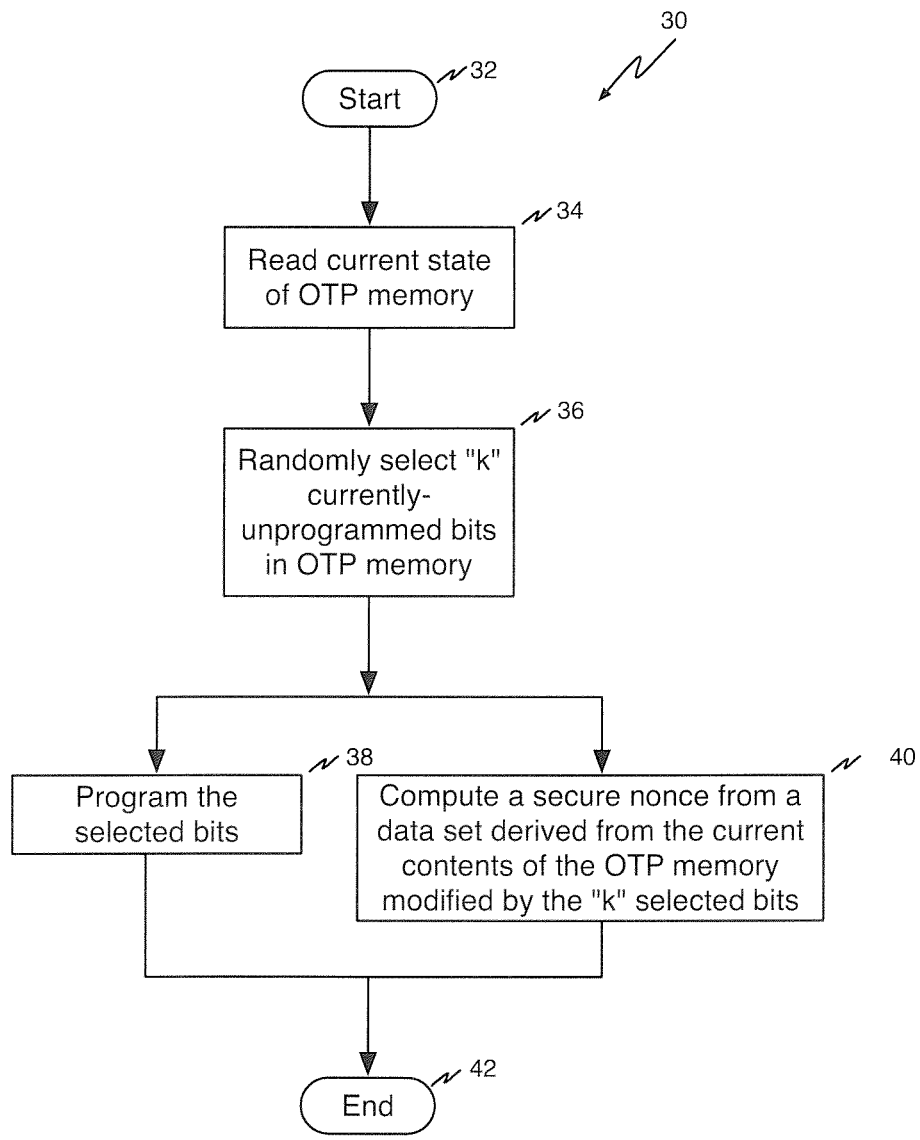
FIG. 5 is a flow chart showing an illustrative method for generating a fresh secure nonce in accordance with the present invention.

Referring now to FIG. 5, a flow chart shows an illustrative method 30 for updating a secure nonce in accordance with the present invention. The method begins at reference numeral 32.

At reference numeral 34 the current state of the OTP NVM 16 of FIG. 4 is read by the controller 12. Note that depending on the implementation, this step may only be needed to be performed once after power-up. For example, the state of the OTP memory, once read, could be temporarily stored in volatile memory. Alternatively, a compressed form of the data set may be temporarily stored in volatile memory. In either case, subsequent nonces could be calculated from the temporary copy without having to necessarily re-read the non-volatile memory. At reference numeral 36, "k" currently-unprogrammed bits of the OTP NVM 16 are randomly selected using the random bit generator 24. Next, at reference numeral 38, the "k" currently-unprogrammed bits of the OTP NVM 16 are programmed and, at reference numeral 40, a secure nonce is generated from a data set derived from the contents of the OTP NVM 16 as modified by the "k" selected bits, for example using a message digest or message authentication code (MAC) algorithm. For added security, the PUF 28 may be used in addition to the data set in computing the secure nonce, for example as the authentication key in a MAC calculation, or as an encryption key using a block cipher. As noted earlier, any calculations may be performed on a data set comprising temporary data such as a copy of the OTP NVM 16 contents held in volatile memory, or on a compressed form of this data and using an incremental update method such as can be done if an appropriate algorithm such as GMAC is used for the compression. Computations using the OTP data, or data derived from it, such as a more convenient compressed form of the nonce, or subsequent application of the nonce, such as for computing a MAC tag to use with external memory contents can occur as soon as desired, and may precede, follow, or, as shown in the illustrative embodiment of FIG. 5, occur in parallel with updating the "k" bits in the OTP memory. In applications of the secure nonce in authenticating external memory, care must be taken when attempting to update both the OTP NVM 16, located on IC 12 and external NMV 14 to keep them in synchronization in case of accidental or malicious power failure, therefore well-known techniques for treating this as an atomic update may need to be applied. The method ends at reference numeral 42.

Referring now to FIG. 6, a flow chart shows an illustrative method 50 for writing data to an external unsecure reprogrammable NVM in accordance with the present invention. The method begins at reference numeral 52.

At reference numeral 54, the data set is updated and a fresh secure nonce is generated using, for example, the method 30 of FIG. 5. At reference numeral 56, data to be written to the external NVM 14 is prepared.

At reference numeral 58, a message authentication code (MAC tag) is computed from the secure nonce and the data to be written to the external NVM 14. The data used to calculate the MAC tag may include some data already written and stored in the external NVM 14, as well as fresh data that is currently being written to the external NVM 14, depending on how the external NVM 14 is partitioned for authentication purposes. The data may optionally also be encrypted, for example using XTS mode of AES as described in NIST SP800-38E. The message authentication code (MAC tag) for the selected external memory contents could be computed using the GMAC algorithm using the secure nonce as the authentication key, similar to the way GMAC could be used for compressing the secure nonce. One option is to combine the compression of the OTP contents (the uncompressed nonce) and the computation of the MAC tag over the external memory data into one operation using GMAC in which case the compressed form of the nonce may just be an intermediate value in the overall calculation or may never even exist at a single place and time. Incremental updates to the GMAC tag(s) for the external NVM 14 could be efficiently computed using the methods already referred to in conjunction with computing the compressed nonce updates. Other authentication algorithms besides GMAC, such as HMAC will also work for authenticating the external memory data, though they may or may not support incremental updates.

At reference numeral 60, the OTP memory 16 is updated, and the data and MAC tag for the data are written to the external NVM 14. Persons of ordinary skill in the art will appreciate that the updating of the OTP memory 16 can occur at this point in the process as shown in the illustrative embodiment of FIG. 6, or at another earlier or later time. The method ends at reference numeral 62.

Referring now to FIG. 7, a flow chart shows an illustrative method 70 for authenticating data received from an external NVM 14 in accordance with the present invention, particularly useful when external NVM 14 is unsecure. The method begins at reference numeral 72.

At reference numeral 74, the secure IC 12 reads the current state of the OTP NVM 16 and computes the current nonce. This nonce will be the same as the nonce generated at reference numeral 54 in FIG. 6. If the power has not been off since the nonce was calculated, it may still be "cached" in volatile memory and this calculation may be avoided. At reference numeral 76 the data and MAC tag are read from the external NVM 14.

At reference numeral 78 the correct MAC tag is computed from the data read from the external NMV 14 at reference numeral 76 and the current nonce computed at reference numeral 74. At reference numeral 80, the computed MC tag of reference number 78 is compared with the MAC tag received with the data from the external NVM 14 of reference numeral 76. If the MAC tags match, the data is determined to be "fresh" and genuine and is decrypted if necessary, and is consumed by the secure integrated circuit at reference numeral 82. The method then ends at reference numeral 84. If at reference numeral 80 the tags do not match, the data is discarded at reference numeral 86. The data may have been maliciously tampered with, there could be a naturally occurring error, or the data may not be "fresh," for example, it may be data which was valid at an earlier time, associated with an earlier nonce, but which has been overwritten with newer data with an associated new MAC tag based on an updated nonce. Penalties may optionally be imposed on the system at reference numeral 86. Such penalties include, but are not limited to, resetting, removing system power or otherwise disabling the secure IC 12, zeroizing critical security parameters such as keys, or disabling one or more I/O connections of the secure IC 12. Penalties can also interact with and affect other parts of the system containing the secure IC 12 and the external NVM 14 to make them more effective in frustrating an attacker. The method then ends at reference numeral 84.

Persons of ordinary skill in the art will appreciate that the above examples use an external NVM 14 as a representative example only, and that the present invention may be employed in situations where secure IC 12 writes data to and reads data from external devices other than the external NVM 14. Therefore, the present invention is intended to include data transactions with devices other than an external NVM memory.

Performing the methods shown and described with reference to FIGS. 5-7 can prevent replay attacks that use previously valid data from an external memory or other device to attempt to trick the secure IC 12. As disclosed herein, the level of security and number of times a device can be used will depend on the size of the internal OTP memory 16.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

The invention claimed is:

1. A method for securely writing data from a secure integrated circuit to a communication channel, the integrated circuit having a one-time programmable (OTP) memory, the method comprising:
   randomly selecting k currently-unprogrammed single OTP bits in the OTP memory, k being selected to provide a predetermined number of bits of entropy for backward and forward security;
   creating a data set using data derived from both programmed and unprogrammed bits of the current contents of the OTP memory altered by programming the k currently-unprogrammed single OTP bits of the OTP memory;
   generating a secure nonce from the data set or data derived from the data set;
   preparing data to write to the communication channel;
   modifying the data as a function of the nonce;
   writing the modified data to the communication channel;
   prior to generating a first secure nonce, program n of the unprogrammed bits, wherein the controller selects an integer for n that results in achieving a target security level;
   designating the OTP as saturated when k becomes larger than the number of single OTP bits that at remain unprogrammed; and
   ceasing to generate additional secure nonces after the OTP memory is designated as saturated.

2. The method of claim 1, wherein generating the secure nonce from the data set or data derived from the data set comprises generating the secure nonce from the data set or data derived from the data set and also incorporating a secret value.

3. The method of claim 2, further comprising:
   computing a physically unclonable function associated with the secure integrated circuit; and incorporating the physically unclonable function in the secret value.

4. The method of claim 1 wherein modifying the data as a function of the nonce comprises appending the nonce to the data.

5. The method of claim 1 wherein modifying the data as a function of the nonce comprises utilizing the nonce as an initialization vector in encrypting the data.

6. The method of claim 1 wherein modifying the data as a function of the nonce comprises generating a message authentication code from the nonce and the data.

7. A method for securely writing data from a secure integrated circuit to an external device, the integrated circuit having a one-time programmable (OTP) memory, the method comprising:
   reading current contents of the OTP memory;
   randomly selecting k currently-unprogrammed single OTP bits in the OTP memory k being selected to provide a predetermined number of bits of entropy for backward and forward security;
   programming the k currently-unprogrammed single OTP bits of the OTP memory;
   creating a data set using data derived from programmed and unprogrammed single OTP bits of the current contents of the OTP memory altered by programming the k currently-unprogrammed single OTP bits of the OTP memory;
   employing as a secure nonce the data set or data derived from the data set;
   preparing data to write to the external device;
   computing a message authentication code from the secure nonce and the data to be written to the external device;
   writing the data and the message authentication code to the external device;
   before generating a first secure nonce, programming n of the unprogrammed bits, wherein n is an integer selected to achieve a target security level;
   designating the OTP as saturated when k becomes larger than the number of single OTP bits that at remain unprogrammed; and
   ceasing to generate additional secure nonces after the OTP memory is designated as saturated.

8. The method of claim 7, further comprising:
   providing a physically unclonable function; and employing the physically unclonable function in generating the secure nonce.

9. The method of claim 7 wherein the external device is a nonvolatile memory.

10. An integrated circuit comprising:
    a controller including a central processing unit, a nonvolatile storage memory coupled to the central processing unit, and a random bit generator coupled to the central processing unit;
    a one-time-programmable memory (OTP) coupled to the controller;
    an external memory interface coupled to the controller;
    wherein the controller is configured to:
    cause the random bit generator to randomly select k currently unprogrammed single OTP bits in the OTP memory k being selected to provide a predetermined number of bits of entropy for backward and forward security;
    create a data set using as data current programmed and unprogrammed contents of single OTP bits of the OTP memory altered by programming the randomly selected k currently-unprogrammed single OTP bits of the OTP memory;
    generate a secure nonce from the data set or data derived from the data set;
    before generating a first secure nonce, program n of the unprogrammed bits, wherein the controller selects an integer for n that results in achieving a target security level;
    designate the OTP is memory as saturated when k becomes larger than the number of single OTP bits that at remain unprogrammed; and
    cease to generate additional secure nonces after the OTP memory is designated as saturated.

11. The integrated circuit of claim 10 wherein the controller is further configured to program the k currently-unprogrammed single OTP bits of the OTP memory.

12. The integrated circuit of claim 10, further comprising a physically unclonable function and wherein the controller is further configured to employ the physically unclonable function in generating the secure nonce.

* * * * *